April 4, 1961

D. H. SHEPARD 2,978,643

TIME INTERVAL MARKING APPARATUS

Filed Nov. 19, 1956

2 Sheets-Sheet 1

INVENTOR
David H. Shepard

BY Mason, Fenwick & Lawrence
ATTORNEYS

April 4, 1961

D. H. SHEPARD 2,978,643

TIME INTERVAL MARKING APPARATUS

Filed Nov. 19, 1956

2 Sheets-Sheet 2

INVENTOR
David H. Shepard

BY
Mason, Fenwick & Lawrence
ATTORNEYS

United States Patent Office 2,978,643

Patented Apr. 4, 1961

2,978,643

TIME INTERVAL MARKING APPARATUS

David H. Shepard, 7838 Jay Miller Drive, Lake Barcroft, Falls Church, Va.

Filed Nov. 19, 1956, Ser. No. 622,981

13 Claims. (Cl. 328—63)

Figure 1:
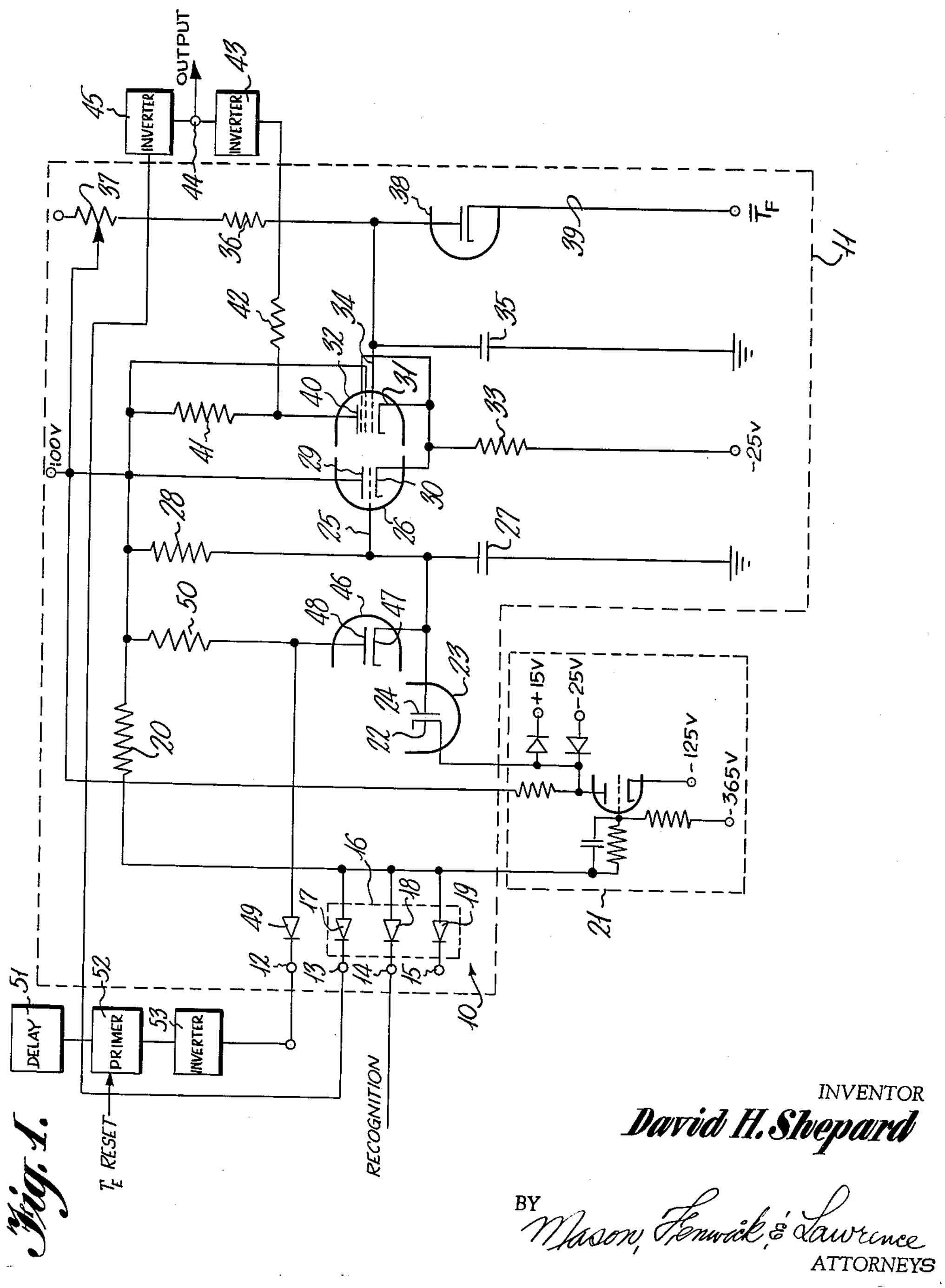

The present invention relates in general to time interval marker apparatus, and more particularly to apparatus for use with automatic character sensing equipment for measuring the time interval between the beginning of a selected cycle of said character sensing equipment and the occurrence of a selected event or events during the selected cycle and generating marking pulses during subsequent cycles which follow commencement of the subsequent cycles by time intervals equal to the measured intervals.

The present invention, while being subject to numerous applications as will be apparent to persons skilled in the art to which the invention pertains, is particularly applicable to the field of automatic character sensing, and the ensuing description will be directed to the use of the present invention in that field. The description of the manner of application of the present invention in the field of automatic character sensing will be adequate to enable persons skilled in the art to understand the manner of its use in other applications.

Automatic character sensing equipment has been heretofore devised for producing output signals identifying characters or numbers sensed by the apparatus. Such equipment may briefly be described as apparatus which scans intelligence bearing documents or the like containing items of information such as printed characters, senses the presence and/or absence of bits of each character thereon with reference to a time and/or positional base and relation, and produces signals indicative of the presence and absence of such bits of characters within the scanning field, such signals being commonly termed recognition and non-recognition signals or pulses, and produces an output at some desired time indicative of the character read. Such apparatus conventionally scans the intelligence bearing surface of the document in recurring cycles scanning in a direction perpendicular to the axis of document motion, which scanning cycles progress from one end of the document to the other along the axis of the document feed path. The speed of such scanning in relation to the speed of document feed is usually such that each character on the document is scanned a large number of times. Usually, the lines of scan extend perpendicular to the line of type in the case of typed or printed alphabetical characters, and are termed vertical scan lines, and the lines of scan progress along an axis parallel to the axis of the line of type.

Examples of typical automatic character sensing apparatus are disclosed in U.S. Patent No. 2,663,758, granted December 22, 1953, to David H. Shepard, and the co-pending patent application of David H. Shepard, Serial No. 399,227, filed December 17, 1953, Patent No. 2,897,481, entitled, Apparatus for Reading. It should be understood, however, that the apparatus of the present invention may be used in conjunction with many different types of automatic character sensing equipment so long as the character sensing equipment is capable of detecting the occurrence of portions of an intelligence bearing character in the scanning field and producing a discrete voltage pulse signifying such detection at a time during its cycle of operation which bears a detectable relation with the time-location of the character portion in the scanning cycle.

Frequently, in special applications involving the use of automatic character sensing equipment, it is desirable to program the character sensing equipment so that it will perform its interpreting functions only in regard to character bit indicating signals and character absence indicating signals derived from restricted portions of the document being scanned, or to interpret information on the basis of presence or absence of characters or character portions at a plurality of discrete pre-selected locations on the document surfaces.

As a particular example, it may be desirable to employ automatic character sensing equipment to sense and interpret the portions if the typewritten or printed address on a mailing envelope indicating the city and state of the addressee while ignoring other portions of the address information. In such event, it would be desirable to subject the interpreter circuits of the character sensing equipment to the character bit presence and absence indicating signals of the characters forming the city and state information only of the address. If the scanning components scan along vertical axes extending perpendicular to the longitudinal axis of the envelope progressing from the bottom to the top of the envelope, and the envelope is fed longitudinally, it would not be satisfactory to merely gate the interpreter circuits to respond to the recognition and non-recognition signals received from the area of the first character intercepted along the scanning beams, because, even through the city and state designating characters occur at the bottom or two bottom lines of the address, the spaces between characters making up the city and state portions of the address would cause the interpreter circuits to respond to recognition and non-recognition signals produced by the first characters in the higher portions of the address which are aligned vertically with the blank spaces in the city and state address line or lines.

An object of the present invention is, therefore, for the provision of novel apparatus for measuring time interval between the beginning of a selected cycle of a recurring cycle of events and the occurrence of a selected event or events during said selected cycle, and producing marking signals during subsequent cycles of said series of recurring cycles whose time occurrence in such subsequent cycles bearing a selected relation to the time of occurrence of the selected event or events in said selected cycle.

Another object of the present invention is the provision of novel apparatus for use with automatic character sensing equipment of the type having recurring scanning cycles, for measuring the time interval between the beginning of a selected scanning cycle and the occurrence of a selected event or events and for producing marking pulses during a selected group of subsequent cycles which follow the commencement of each subsequent cycle by a time interval equal to the time interval between the beginning of the selected cycle and the occurring of the selected event or events.

Another object of the present invention is the provision of novel time interval marking apparatus for use with automatic character sensing equipment for detecting the time of occurrence of a selected event or combination of events during a selected scanning cycle of the character sensing equipment and producing during subsequent scanning cycles pulses marking the time during such subsequent cycles when selected event or events occurred during such selected cycles.

Another object of the present invention is the provision of novel apparatus for use with automatic character sensing apparatus having scanning means for scanning a plurality of lines of typed characters on a character bearing document along lines of scan perpendicularly intercepting said plurality of lines of type, to detect the time interval between the beginning of a selected scanning cycle and the occurrence of the selected one of said lines of type and creating marking pulses during subsequent scanning cycles corresponding to the time of sensing of said selected line of type during said selected scanning cycle.

Other objects, advantages, and capabilities of the present invention will become apparent from the following detail description, taken in conjunction with the accompanying drawings showing one preferred embodiment of the invention.

Figure 2:
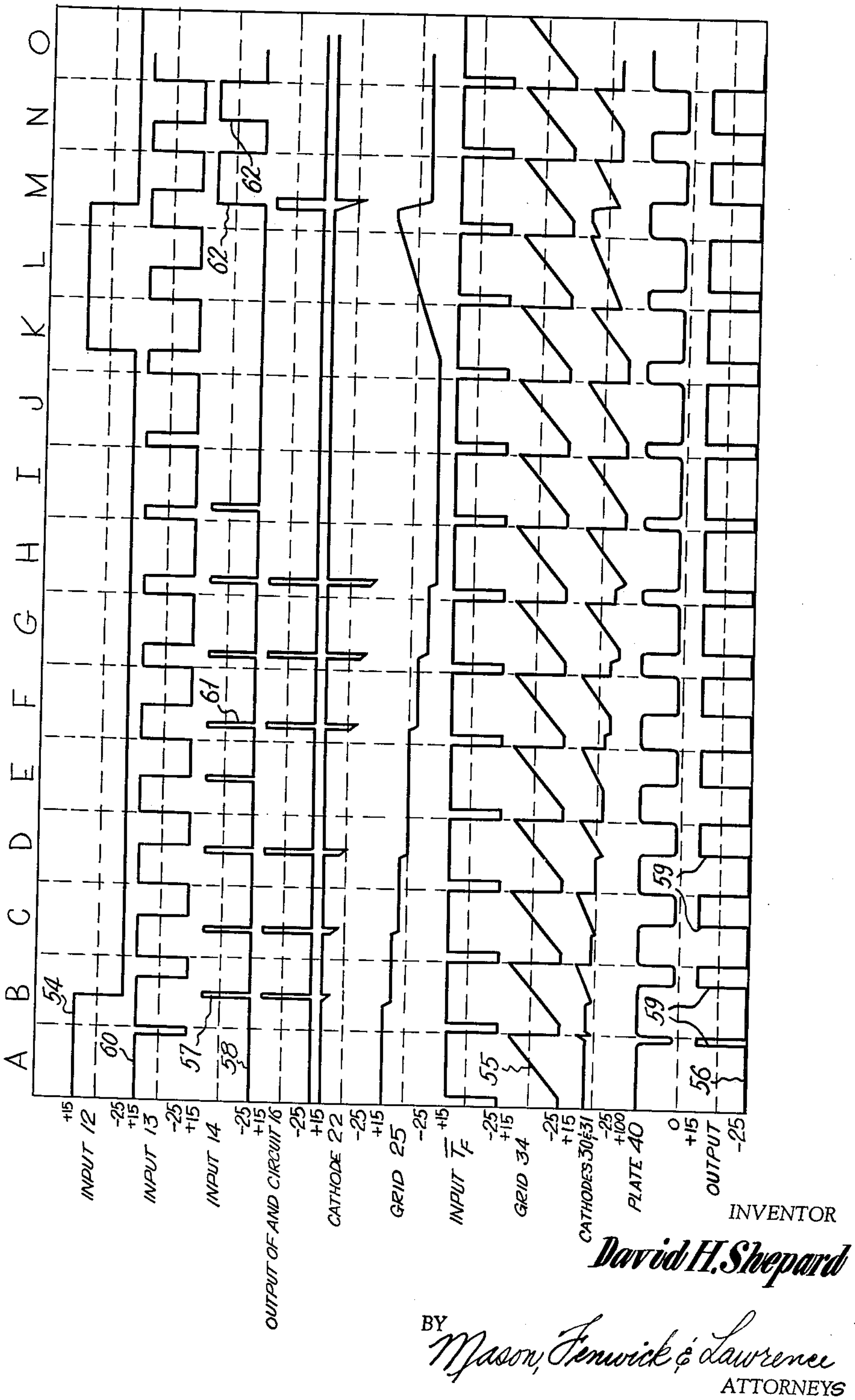

In the drawings:

Figure 1 is a view, partly in schematic form and partly in block diagram form, showing time interval marker apparatus embodying the present invention; and Figure 2 illustrates a series of time-related voltage wave forms showing time variant voltages at the points indicated alongside the vertical coordinate.

The present invention in general comprises a marking pulse generating stage which is non-conducting at the commencement of each scanning cycle of a vertical line of scan perpendicular to the document feed axis. A cyclic sawtooth voltage is applied to the control grid of this marking pulse generating stage to normally elevate the grid voltage on this stage so as to bring the same into conduction immediately prior to the completion of each scanning cycle. A generator control stage regulates the cathode potential of the marking pulse generating stage. The grid bias on the control stage is normally maintained at a sufficiently high potential to so regulate the cathode potential of the marking pulse generating stage that the latter will not go into conduction until immediately prior to the completion of each scanning cycle. Reset means are employed to gate the circuit and render it operative to perform its appropriate functions from the time of the first bit of character recognition until reading of the document is completed, and to reset the circuit upon completion of document reading. Plural input comparator means are provided to produce selected voltage conditions upon occurrence of particular combinations of events. In this simple preferred example, the comparator means produces a first distinctive voltage condition during the occurence of the recognition pulse prior to occurrence of the normal marking pulse adjacent the completion of the cycle after a first portion of the character is detected, i.e., a first recognition pulse is begun, and a second distinctive voltage condition otherwise.

These outputs, through suitable circuitry, vary the control grid bias on the generator control stage to advance the point in each cycle when the marking pulse generator goes into conduction so long as the recognition pulse occurs prior to the marking pulse. The apparatus therefore achieves a stepwise advance of the point in each cycle when the marking pulse is generated so long as the recognition pulse occurs prior to the marking pulse to progressively bring the time of occurrence of the marking pulse and of the recognition pulse into coincidence. The point in time during the cycle at which the recognition pulse or other event occurs as measured from the time of initiation of the cycle is termed hereinafter the "cycle time" of the event.

The invention will be more fully understood from the following detail description of the prefered embodiment illustrated in the drawings.

The components of the time interval marking unit comprising a preferred embodiment of the invention, and which are most conventionally assembled in a pluggable unit for association with automatic character sensing apparatus are generally indicated by the reference character 10 and are illustrated in Figure 1 within the area of the broken lines 11.

The time interval marking unit 10 is provided with four input terminals designated by the reference characters 12, 13, 14 and 15 to receive various input signals to be later described. The signals applied to the input terminals 13, 14 and 15 are applied to an AND circuit 16 of conventional design which is well-known in the computer arts and, to this end, the terminals 13, 14 and 15 are connected directly to the cathodes of HD2120 diodes 17, 18 and 19, whose anodes are connected together through a resistor 20, which in the preferred embodiment is a 47 K ohm resistor, to plus 100 volts. The anodes of the diodes 17, 18 and 19 forming the AND circuit 16 are also connected through a conventional inverter stage shown in dotted lines at 21 to the cathode 22 of a bias stepping diode 23, which in the preferred embodiment is one-third of a 6BC7 multiple diode vacuum tube. The plate 24 of the bias stepping diode 23 is connected directly to the control grid 25 of a generator control stage 26, formed in the preferred embodiment by the triode section of a 6U8 triode-pentode tube. A grid biasing capacitor 27 is connected between the grid 25 and ground, and is preferably a .03 microfarad capacitor, and is connected through a large resistor 28 to plus 100 volts. The plate 29 of the generator control stage 26 is connected directly to plus 100 volts and the cathode 30 of the control stage 26 is connected directly with the cathode 31 of the marking pulse generator pentode stage 32, and through a cathode biasing resistor 33 to minus 25 volts.

The control grid 34 of the marking pulse generator stage 32 is connected through a sawtooth generating capacitor 35 to ground, the capacitor 35 in the preferred embodiment being a .001 microfarad condenser and is connected through a 100 K ohm resistor 36 and a one megohm potentiometer 37 to plus 100 volts. The grid 34 is also connected to the plate of a marker cycling diode 38 whose cathode is connected through lead 39 to a source of negative pulses produced at the beginning of each vertical line of scan of the character sensing apparatus scanning unit, which will preferably be inverted timing pulses, conventionally designated $\bar{T}_F$.

The plate 40 of the marking pulse generator 32 is connected through a plate load resistor 41, preferably a 33 K ohm resistor, to plus 100 volts, and through a 130 K ohm resistor 42 and a conventional inverter stage 43 to the marking pulse output terminal 44.

The marking pulse output signal at the terminal 44 is fed back to the input terminal 13 through a conventional inverter stage 45 so that the inverted marking pulse output signal becomes the input to terminal 13 and diode 17 of the apparatus. Recognition pulses produced upon detection of a character bit in the scanning field by the scanning and detecting stages of the automatic character sensing apparatus with which the present time interval marking apparatus is to be associated, preferably of the type disclosed in said application Serial No. 399,227, filed by David H. Shepard, are applied to input terminal 14. Input terminal 15 which is connected to the cathode of the third AND circuit diode 19 is available for adding different criteria to the operation of the AND circuit 16 when desired.

A reset gating diode 46 is also provided in the circuit, with its cathode 47 directly connected to the top of the grid biasing capacitor 27 and with its plate 48 connected to the anode of a 3U1 selenium diode 49 whose cathode is connected directly to the input terminal 12. The plate 48 is also connected through a 100 K ohm resistor 50 to plus 100 volts. Delay stage 51, a hard tube reset primer stage 52 and an inverter stage 53 are connected to the input terminal 12 to provide a suitable reset signal for the reset gating diode 46.

The operation of the time interval marking unit can be more fully understood by referring to the voltage wave forms illustrated in Figure 2 of the drawings. The input to terminal 12 serves to reset the unit and maintain the time of occurrence of the marking pulses at the output at terminal 44 uniform at a time near the end of each cycle until the scanning and detecting components of the character sensing apparatus units detect recognition satisfying specific requirements. Preferably, the reset signal for input terminal 12 is at plus 15 volts during the period from completion of reading of one document to the detection of bits of character recognition satisfying specified requirement on the next document advancing along the document feed path, and is at minus 25 volts from a selected delay time after these bits of character recognition occur until termination of reading of the document bearing that character. This is accomplished by feeding character bit recognition signals derived from the scanning and detecting components of the automatic character sensing apparatus to the delay unit 51 and thence to the reset primer 52 which is triggered into conduction by the delayed recognition signal in a known manner, and continues in a state of conduction. While the delay unit 51 is specifically shown in the drawing and described hereinabove in the specification, it is not essential to the operation of the device and will be assumed to be eliminated in the following discussion in order to simplify an understanding of the invention. When the delay unit is eliminated from consideration, it must be assumed that the "recognition" lead of Figure 1 is connected to the input of the primer 52 as well as to the input terminal 14 in order that the primer 52 may be triggered into conduction by the recognition signal derived from the automatic character sensing apparatus, as the recognition signals which trigger the primer 52 when the delay unit 51 is in the unit are applied through the delay unit 51. Conduction is suppressed by application of an end-of-document pulse, usually designated as $T_E$, derived for example from a photo-cell disposed beneath the document feed path to receive light when the end of the document passes thereover. The output of the reset primer 52 is inverted by the inverter stage 53 and assumes the form of the voltage wave form 54 illustrated in Figure 2. When the wave form 54 applied to input terminal 12 is at plus 15 volts, as is shown in frames A, K and L of Figure 2, the plate 48 of reset gating diode 46 is at a sufficiently high potential to cause the diode 46 to conduct and hold the grid 25 of the generator control stage 26 at a potential of plus 15 volts. The circuit constants of the stage of which the generator control tube 26 forms a part are such that the triode section 26 conducts quite heavily when its grid 25 is at plus 15 volts and through the cathode biasing action of the resistor 33, brings the potential of its cathode 30 up to a voltage above grid potential. Since the cathode 31 of the marking pulse generator tube 32 is tied directly to the cathode 30 this biases the marking pulse generator tube 32 so that it can conduct only at the peak of the sawtooth wave form, indicated at 55 in Figure 2, which occurs at the grid 34 of the tube 32. The sawtooth wave form 55 is generated by the capacitor 35 charging up to plus 15 volts through the resistor 36 and the potentiometer 37, and being quickly discharged at the completion of each vertical scan of the character sensing apparatus scanning unit upon conduction of the marker cycling diode 38, when the $\bar{T}_F$ pulses are applied to its cathode 39. The potentiometer 37 is used to set the resistance of the charging path of condenser 35 high enough so that the grid 34 will go all the way to plus 15 volts, but low enough so that it will not take the entire frame to do so. The marking pulse output at terminal 44, as is indicated by the wave form 56 is therefore down at minus 25 volts over the major portion of each cycle until the marking pulse generator stage 32 begins to conduct near the peak of the sawtooth wave form 55, and then rises to plus 15 volts for the remainder of the frame.

When recognition pulses derived from the character scanning apparatus are applied to the reset primer 52 to trigger it, the output from the inverter 53 which is applied to the input terminal 12 (the wave form 54) goes down to minus 25 volts and remains at this potential until the primer 52 is triggered off by the $T_E$ pulse. When the voltage applied to input terminal 12 is down at minus 25 volts, the plate 48 of the reset gating diode 46 to which this signal is applied through the diode 49 is held down to a sufficiently low potential to cut off gating diode 46 and permit the potential at the control stage grid 25 to drop to whatever potential between plus 15 volts and minus 25 volts the rest of the circuit dictates.

Assuming that the input voltage 54 applied to the terminal 12 is down at minus 25 volts, the operation of the unit upon application of narrow recognition pulses such as the spikes 57 of the wave form 58 to the input terminal 14 is as follows. In the following disclosure, it will be assumed that no input is applied to the terminal 15. If the first character bit recognition pulses 57 for each of the vertical scan cycles or "frames" occur in the last half of the frame, the recognition pulse 57 would arrive at the input terminal 14 before the marking pulse 59, which is produced at output terminal 44 and inverted by inverter stage 45, is applied to the input terminal 13. The output of the AND circuit 16 is therefore up at plus 15 volts for the duration of the recognition pulse 57. This, through the action of the inverter 21, depresses the voltage at the cathode 22 on the bias stepping diode 23 to cause the diode 23 to conduct and partially discharge the condenser 27, the amount of discharge depending on the period of conduction of the diode 23.

An important feature in the operation of this unit is the character of the discharge of the condenser 27 through the diode 24 and the inverter 21. While the output of an inverter of the type illustrated in the broken lines 21 normally goes from plus 15 volts to minus 25 volts in a microsecond or less, the inverter 21 in the present circuit must discharge the condenser 27. The conduction path is through condenser 27, diode 24 and the triode of the inverter 21 to minus 125 volts which is the cathode potential of the inverter. The circuit constants of this conduction path are such that the potential on the condenser 27 drops on an exponential curve from plus 15 volts toward approximately minus 60 volts, the latter being the potential which the inverter plate would finally reach if the minus 25-volt clipping diode connected to the plate of the inverter were removed. The character of this discharge is illustrated in the gridwave form of grid 25 in Figure 2, wherein this wave form is shown as having a sloping discharge. The importance of this feature is apparent when it is realized that inverters are normally thought of in the computer field as having a rapid action and if the condenser 27 were discharged virtually instantaneously by an inverter operating in the normal substantially instantaneous manner, the scheme would be rendered inoperative.

This partial discharge of the condenser 27 lowers the potential on the grid 25 on the control tube 26, causing tube 26 to conduct less heavily, since the tube 26 is cathode biased. This lowering of its conduction lowers the potential of the cathodes 30 and 31, and permits the tube 32 to conduct for a longer interval at the end of each frame, that is, this lowers its cut-off potential and permits the rising sawtooth grid voltage to bring tube 32 into conduction at an earlier point in the frame. The leading edge of the positive marking pulse 59 of the output wave form 56 at terminal 44 and the inverted output wave form 60 fed back to the input terminal 13 accordingly advance to an earlier point in the frame. This is depicted in frame B of Figure 2. This stepwise discharge of condenser 27 due to conduction of the bias stepping diode 23 upon occurrence of the recognition pulse 57 earlier in the frame than the marking pulse 59 will continue for as many frames as is necessary to lower the potential of grid 25 and cathodes 30 and 31 sufficiently to permit the marking pulse generating tube 32 to begin conducting at the same point in the frame that recognition appears. In this condition, the cycle time of the marking pulses in the succeeding cycles then corresponds with the cycle time of the recognition pulse 57. This is depicted in frames C, D and E of Figure 2.

When the leading edges of the marking pulses 59 of wave form 56 at output terminal 44 are advanced into synchronism with the leading edges of recognition pulses 57, the input terminal 13 then goes to minus 25 volts when the input terminal 14 goes up to plus 15 volts causing AND circuit output to remain down. This, through the action of the inverter 21 maintains the bias stepping diode in non-conducting condition so long as no earlier recognition pulse occurs. Accordingly, there are produced at the output terminal 44 marking pulses 59 whose leading edges mark the point during the frame at which the first bit of character recognition occurred. The time constant of the grid circuit of grid 25 is such that no substantial change in the location of the marking pulses will occur for many frames after the recurrent recognition pulse on which the system was previously locked disappears.

If the input wave form 54 to input terminal 12 is still down and a narrow recognition occurs earlier than the recognition pulse 57 in the latter half of the frames, for example, if an earlier recognition pulse 61 occurs in the first half of the frame as illustrated in frames F, G, H and I of Figure 2, the leading edges of the marking pulse 59 will again be advanced as the output of the AND circuit 16 will be up at plus 15 volts for the duration of the new recognition pulse 61 so long as both the pulse 61 at input terminal 14 and the wave form 60 at input 13 are at plus 15 volts, and a new stepwise discharge of capacitor 27 will begin. This new stepwise discharge will continue as before until the input wave form 60 at terminal 13 is down from the point in the frame where the new recognition pulse 61 occurs until the end of the frame, thereupon halting the further discharge of the capacitor 27.

For fullness of discussion there is also illustrated at frames M and N the operation of the time interval marker apparatus when the recognition pulses at input terminal 14 are long duration pulses. In the preceding discussion, the recognition spikes 57 and 61 were assumed to be only a few microseconds wide. Since capacitor 27 charges up through the diode 46 at a rate of the order of two-thirds volt per microsecond, it requires a number of cycles for the marking pulses 59 to be brought into time coincidence with the recognition pulses. If, however, wide recognition pulses such as the pulses 62 are applied to the input terminal 14, it is possible for the leading edges of the marking pulses 59 to be brought into coincidence with the leading edges of the recognition pulses 62 in a fraction of a frame, as is illustrated in frames M and N of Figure 2.

The cycle time of the leading edges of the marking pulses 59 at the output terminal 44 remain approximately constant in marking the point where recognition occurred even though the recognition pulses may disappear for a time before the reset wave form applied to terminal 12 goes up to plus 15 volts marking the end of document recognition. The reason for this is that the potential of the grid 25 of the control stage 26 is held approximately constant by the resistor 28. If the resistor 28 were not in the circuit the potential of the grid 25 would tend to slowly drift negatively during non-conduction of the diode 23 as grid current caused electrons to accumulate on the capacitor 27. This downward drift is avoided by tying the grid 25 to plus 100 volts through the resistor 28, and the resistor 28 is preferably of an appropriate value such as 100 megohms so that a very slight upward drift in the potential of the grid 25 occurs.

Upon completion of scanning of the document, the $T_E$ pulse is generated in a suitable manner, and when applied to the reset primer 52, produces the rise in the wave form 54 applied to the input terminal 12 as depicted in frames K and L of Figure 2, thereby bringing the reset gating diode 46 into conduction to charge the capacitor 27 up to plus 15 volts, thereby bringing the grid 25 to the proper potential to return the marking pulse generating tube 32 to a high cut-off potential. This returns the apparatus to reset condition in a short period of time wherein the marking pulses are again being produced immediately prior to the completion of the frames.

It will be apparent that the marking pulses produced at the output terminal 44 may be applied to known circuitry to produce a gating wave form for gating the interpreter circuits of the character sensing apparatus to interpret only the information detected during the portions of the frames of scanning cycles following occurrence of the leading edges of the marking pulses. By this expedient the interpreting functions of the character sensing apparatus can be confined to certain regions of the document having a known time relation to the occurrence of the first character bit recognition during vertical scans. Instead of causing the leading edges of the marking pulses to occur simultaneously with the occurrence of the first character bit recognition in a vertical scan, additional conditions may be imposed upon the time of occurrence of the marking pulses by appropriate signals applied to the input terminal 15 so that the AND circuit 16 is responsive to the conditions at terminals 13, 14 and 15.

While a preferred and practical embodiment of the invention has been disclosed in the above description, it will be understood by those skilled in the art that the specific details and arrangement of components, as shown, are by way of example and not to be construed as limiting the scope of the invention.

I claim:

1. Apparatus for marking with electrical pulses the time of occurrence of prior events in recurring cycles of events comprising marking pulse generating means for producing a marking pulse during each cycle of the recurring cycle of events, control means for regulating the time of production of marking pulses in each cycle by said generating means, means responsive to the time of occurrence of a selected event during a selected cycle of said recurring cycles when said selected event occurs at a time in the selected cycle prior to occurrence of marking pulse therein for electrically conditioning said control means to advance the time of production of marking pulses in said cycle by said generating means to bring said marking pulses into time coincidence with the occurrence of said selected event, and means causing said generating means to continue to produce marking pulses during cycles subsequent to said selected cycle having a time interval relationship to the commencement of such subsequent cycles corresponding to the time of occurrence of the selected event in said selected cycle.

2. Apparatus for marking with electrical pulses the time of occurrence of prior events in recurring cycles of events, comprising marking pulse generating means for producing a marking pulse during each cycle of the recurring cycle of events, control means for regulating the time of production of marking pulses in each cycle by said generating means, means responsive to the time of occurrence of a selected event during a selected cycle of said recurring cycles when said selected event occurs at a time in the selected cycle prior to occurrence of a marking pulse therein for electrically conditioning said control means to advance the time of production of marking pulses in said cycle by said generating means to bring said marking pulses into time coincidence with the occurrence of said selected event, and means for rendering the production of marking pulses by said generating means independent of the occurrence of said selected event for a selected period of time upon occurrence of another selected event.

3. Apparatus for marking with electrical pulses selected time positions in recurring cycles of events, comprising marking pulse generating means for producing a marking pulse during each of the recurring cycles, means normally conditioning said generating means to produce said marking pulses at a selected delay time following commencement of each of the recurring cycles, input means having an electrical condition which varies in pre-selected relation to the time of occurrence of a selected event during the delay interval of a selected cycle of said recurring cycles, control means for said generating means responsive to said variable electrical condition for advancing the time of production of said marking pulses by said generating means in pre-selected relation to variation of said electrical condition to cause the time of production of said marking pulses during a plurality of subsequent cycles to duplicate the relative time of occurrence of said selected event in said cycle, and means operative upon occurrence of other selected events for resetting said generating means to produce said marking pulses at said selected delay interval.

4. Apparatus for marking with electrical pulses selected time positions in recurring cycles of events, comprising pulse generating means for producing a marking pulse during each of the recurring cycles, means for applying a sawtooth time variant voltage to said generating means during each of said recurring cycles, means normally biasing said generating means to a state of conduction at a selected delay time following commencement of each of the recurring cycles to produce a marking pulse for the duration of the cycle, a capacitor circuit for varying the biasing of said generating means in accordance with electrical charge conditions in said capacitor circuit, input means responsive to the time of occurrence of a selected event during the delay interval of a selected cycle of said recurring cycles for varying the electrical charge condition in said capacitor circuit in pre-selected relation to the time of occurrence of said selected event, said capacitor circuit varying the biasing of said generating means in such a way as to increase the period of conduction of said generating means to advance the time of production of said marking pulses into coincidence with the time of occurrence of said selected event, and means causing said generating means to reproduce marking pulses at a time during a plurality of cycles subsequent to said selected cycle corresponding substantially to the time of occurrence of said selected event during said selected cycle.

5. Apparatus for marking with electrical pulses selected time positions in recurring cycles of events comprising pulse generating means for producing a marking pulse during each of the recurring cycles, means for applying a sawtooth time variant voltage to said generating means during each of said recurring cycles, means normally biasing said generating means to a state of conduction at a selected delay time following commencement of each of the recurring cycles to produce a marking pulse for the duration of the cycle, a capacitor circuit for varying the biasing of said generating means in accordance with electrical charge conditions in said capacitor circuit, input means responsive to the time of occurrence of a selected event during the delay interval of a selected cycle of said recurring cycles for varying the electrical charge condition in said capacitor circuit in pre-selected relation to the time of occurrence of said selected event, said capacitor circuit varying the biasing of said generating means in such a way as to increase the period of conduction of said generating means to advance the time of production of said marking pulses into coincidence with the time of occurrence of said selected event, and means responsive to the occurrence of another selected event for resetting said generating means to produce marking pulses at said selected delay time.

6. Apparatus for use with an automatic character sensing device and the like for producing pulses during a plurality of cycles of a recurring cycle of said device to mark during cycles subsequent to a selected cycle the time during such subsequent cycles corresponding to the time of occurrence of a selected event during said selected cycle, comprising marking pulse generating means for producing a marking pulse during each cycle of the recurring cycles, control means for regulating the time of production of said marking pulses during each cycle, said control means normally conditioning said generating means to a ready condition to produce said marking pulses at a selected time during each of said recurring cycles, means responsive to the time of occurrence of a selected event during a selected cycle of said recurring cycles occurring prior to said selected time for varying said control means to adjust the time of production of said marking pulses by said generating means into time coincidence with the occurrence of said selected event, and means causing said generating means to produce marking pulses for a plurality of cycles subsequent to said selected cycle at times during said subsequent cycles corresponding to the time of occurrence of said selected event in said selected cycle.

7. Apparatus for use with an automatic character sensing device and the like for producing pulses during a plurality of cycles of a recurring cycle of said device to mark during cycles subsequent to a selected cycle the time during such subsequent cycles corresponding to the time of occurrence of a selected event during said selected cycle, comprising marking pulse generating means for producing a marking pulse during each cycle of the recurring cycles, control means for regulating the time of production of said marking pulses during each cycle, said control means normally conditioning said generating means to a ready condition to produce said marking pulses at a selected time during each of said recurring cycles, means responsive to the time of occurrence of a selected event during a selected cycle of said recurring cycles occurring prior to said selected time for varying said control means to adjust the time of production of said marking pulses by said generating means into time coincidence with the occurrence of said selected event, and means responsive to the occurrence of another selected event to return said generating means to said ready state condition.

8. Apparatus for use with an automatic character sensing device and the like for producing pulses during a plurality of cycles of a recurring cycle of said device to mark the time of occurrence of a selected event during a selected cycle, comprising marking pulse generating means for producing a marking pulse at a pre-selected time during each recurring cycle immediately prior to the end of each cycle, regulator means for advancing the time of production of said marking pulse during each of said recurring cycles by said generating means responsive to a voltage applied to said regulator means, means responsive to the occurrence of a selected event-indicating pulse occurring prior to the said marking pulses during each recurring cycle to apply voltages to said regulator means for progressively advancing the time of production of said marking pulses in each cycle into coincidence with the occurrence of said selected event-indicating pulse, means terminating marking pulse advancing action of said regulating means when said marking pulse is advanced to time coincident with said selected event-indicating pulse, means for reproducing said marking pulses for a selected number of recurring cycles subsequent to said selected cycle to mark in said subsequent cycle the time of occurrence of said selected event-indicating pulse in said selected cycle, and means for resetting said marking pulse generating means to produce marking pulses at said pre-selected time upon occurrence of another selected event.

9. Apparatus for use with an automatic character sensing device and the like for producing pulses during a plurality of cycles of a recurring cycle of said device to mark the time of occurrence of a selected event during a selected cycle, comprising marking pulse generating means for producing a marking pulse during each of the recurring cycles at a time determined by the biasing voltage condition thereof, means for applying a sawtooth time variant voltage to said generating means during each of said recurring cycles, biasing means for said generating means for establishing a normal biasing voltage state causing said generating means to conduct only during a short duration at the peak portion of said sawtooth voltage immediately preceding the end of each of said cycles to produce a marking pulse during the period said generating means is conducting, a capacitor circuit having a variable electrical charge condition for varying the bias established by said biasing means in pre-selected relation, input means responsive to signals denoting detection of selected character portion by said character sensing apparatus for varying said electrical charge condition of said capacitor circuit in selected relation to the time of occurrence of said detected character portions during a selected cycle of said recurring cycles, said capacitor circuit varying said biasing means in accordance with the electrical charge condition thereof in a direction to progressively enlarge the conduction period of said generating means upon application of said sawtooth voltage thereto to advance the time of initiation of said marking pulse into coincidence with the time of occurrence of said detected character portion during said selected cycle, means causing said adjusted biasing condition of said biasing means to persist for a plurality of cycles following said selected cycle, and means responsive to signals denoting completion of scanning of a document by said character sensing device to reset said biasing means to said normal biasing condition for a plurality of cycles.

10. Apparatus for electrically marking the time of occurrence of prior events in recurring cycles of events comprising adjustable means responsive to recurring cycle reference signals applied thereto for producing marking pulses during subsequent cycles of the recurring cycles which follow said reference signals by an adjustable time interval, and control means responsive only to selected event signals applied thereto occurring prior to said marking pulses for adjusting said adjustable means to produce marking pulses in time coincidence with said prior occurring selected event signals.

11. Apparatus for electrically marking the time of prior events in recurring cycles of events comprising marker generator means responsive to a control voltage and to recurring cycle reference signals applied thereto for producing marking pulses during subsequent cycles of the recurring cycles, said marking pulses following said reference signals by a controlled time interval, adjustable storage means responsive to corrective adjustment signals applied thereto for storing a marker generator control voltage, comparing means differentially responsive to said marking pulses and to selected event signals applied thereto for producing corrective adjustment signals only when said controlled time interval is greater than the interval by which said selected event signals follow said reference signals, and means for applying said corrective adjustment signals to said marking generator means to reduce said controlled interval.

12. Apparatus for marking the cycle time of selected prior events in recurring cycles of events comprising adjustable means responsive to recurring cycle reference signals applied thereto for producing marking pulses during succeeding cycles of the recurring cycles, said marking pulses occurring at an adjustable cycle time, and control means responsive only to selected event signals applied thereto occurring prior to said marking pulses for adjusting said adjustable cycle time to equal the cycle time of said selected event signals.

13. Apparatus for electrically marking the cycle time of prior events in recurring cycles of events comprising, marker generator means responsive to a control voltage and to recurring cycle reference signals applied thereto for producing marking signals during subsequent cycles of the recurring cycles which marking signals occur at controlled cycle times, adjustable storage means for storing a marker generator control voltage, said storage means being operative to respond to successive adjustment signals applied thereto by storing successive different control voltages for advancing the said controlled cycle time to an earlier cycle time, comparing means differentially responsive to said marking pulses and to selected event signals applied thereto for producing the adjustment signals during each cycle of said recurring cycles only when the cycle time of the selected event signals is earlier than said controlled cycle time.

References Cited in the file of this patent

UNITED STATES PATENTS

| | | |
|---|---|---|
| 2,450,360 | Schoenfeld | Sept. 28, 1948 |
| 2,608,615 | Oberman | Aug. 26, 1952 |
| 2,629,861 | Begun | Feb. 24, 1953 |
| 2,663,758 | Shepard | Dec. 22, 1953 |
| 2,727,209 | Mayer | Dec. 13, 1955 |
| 2,741,756 | Stocker | Apr. 10, 1956 |